US007249456B2

(12) United States Patent
Schulte et al.

(10) Patent No.: US 7,249,456 B2
(45) Date of Patent: Jul. 31, 2007

(54) METHOD OF CONTROLLING A HEATING DEVICE OF A PARTICLE FILTER

(75) Inventors: Hermann-Josef Schulte, Menden (DE); Hans-Peter Frisse, Herzogentath (DE); Arno Schindler, Fröndenberg (DE); Klaus Schrewe, Rüthen (DE)

(73) Assignee: HJS Fahrzeugtechnik GmbH & Co. KG, Menden (DE)

( * ) Notice: Subject to any disclaimer, the term of this patent is extended or adjusted under 35 U.S.C. 154(b) by 47 days.

(21) Appl. No.: 11/157,660

(22) Filed: Jun. 21, 2005

(65) Prior Publication Data

US 2005/0235634 A1    Oct. 27, 2005

Related U.S. Application Data

(63) Continuation-in-part of application No. PCT/EP03/14217, filed on Dec. 13, 2003.

(30) Foreign Application Priority Data

Jan. 13, 2003   (DE) ............................... 103 01 035

(51) Int. Cl.
   *F01N 3/00*    (2006.01)
   *F01N 3/02*    (2006.01)
(52) U.S. Cl. .............................. 60/295; 60/297; 60/311
(58) Field of Classification Search .................. 60/295, 60/297, 311
   See application file for complete search history.

(56) References Cited

U.S. PATENT DOCUMENTS

| 4,424,671 A | 1/1984 | Tokura |
| 4,462,379 A | 7/1984 | Kato et al. |
| 4,719,751 A | 1/1988 | Kawagoe et al. |
| 5,511,413 A | 4/1996 | Steiner et al. |
| 5,820,833 A * | 10/1998 | Kawamura .................. 422/174 |
| 6,438,948 B2 * | 8/2002 | Ono et al. .................... 60/311 |
| 6,598,387 B2 * | 7/2003 | Carberry et al. .............. 60/297 |
| 6,708,487 B2 * | 3/2004 | Morimoto et al. ............ 60/311 |
| 2002/0073696 A1 | 6/2002 | Sayed et al. |
| 2002/0078681 A1 | 6/2002 | Carberry et al. |

* cited by examiner

*Primary Examiner*—Thomas Denion
*Assistant Examiner*—Loren Edwards
(74) *Attorney, Agent, or Firm*—R. S. Lombard

(57) ABSTRACT

A method of controlling the energization of a heating device for the regeneration of a particle filter disposed in the exhaust duct of an internal combustion engine, particularly a Diesel engine, wherein a measure for the soot charge state of the particle filter the exhaust gas back pressure is determined while the engine is preferably idling, the exhaust gas recirculation is switched off, and predetermined conditions are present in the exhaust gas duct upstream of the particle filter, and then an exhaust gas back pressure signal is compared with a threshold value indicating a soot charge sufficient for the initiation of a regeneration of the particle filter and the heating device is enabled for the initiation of the regeneration procedure if the exhaust gas back pressure signal is greater than the threshold value.

15 Claims, 2 Drawing Sheets

METHOD OF CONTROLLING A HEATING DEVICE OF A PARTICLE FILTER

CROSS-REFERENCE TO RELATED APPLICATION

This is a continuation-in-part application of international application PCT/EP 2003/O14217 filed Dec. 13, 2003 and claiming the priority of German application 103 01 035.1 filed Jan. 13, 2003.

BACKGROUND OF THE INVENTION

This invention resides in a method of controlling a heating device for the regeneration of a particle filter arranged in the exhaust duct of an internal combustion engine such as a Diesel engine, wherein the exhaust gas back pressure caused by the particle filter is determined as an indication for the soot charge state of the particle filter.

For the reduction of the emission of particles, particularly the emission of soot during operation of Diesel engines, so-called Diesel particle filters are installed in the exhaust duct of the Diesel engine such that the exhaust gas is conducted through the filter body of these particle filters. During this process, particles contained in the exhaust gas are deposited on the upstream surface of the filter body, particularly soot particles. Starting with a new particle filter without any soot deposits increasing amounts of soot are deposited on the upstream surface of the filter body over a period of operation. In order to ensure that the sufficient exhaust gas can flow through the filter over an extended period, the soot removed from the exhaust gas and deposited on the particle filter must be removed from time to time. The removal of the soot from the particle filter is also called regeneration of the filter.

For the regeneration of such a particle filter the soot deposited on the filter is burnt off. The removal of this soot deposited on the upstream filter surface occurs automatically when the temperature of the exhaust gas reaching the surface of the particle filter is higher than the ignition temperature of the soot. In a Diesel engine, this is the case if it is operated over a certain time under a certain load, for example, in a passenger vehicle during high speed Autobahn travel. However, in order to ensure regeneration and consequently the intended operation of a particle filter also under engine load conditions when the exhaust gas temperature is below the ignition temperature of the soot, methods have been developed by which the particle filter can be regenerated depending on the soot charge state of the particle filter. Then the soot is burnt off by the generation of additional thermal energy for example, by thermoelectric heating elements or by a burner or an oxygen control which results in increased exhaust gas temperatures. In order to provide for a predetermined regeneration of the particle filter by burning off the soot, a certain amount of soot must have been collected on the upstream surface of the particle filter. If the amount of soot collected on the filter surface is too small, the soot may be burnt off only incompletely. And if the amount of soot collected on the filter surface is too large, the particle filter may be damaged during soot burn off.

For this reason, in a known method this exhaust gas back pressure in the exhaust duct ahead of the particle filter is determined since the exhaust gas back pressure is a measure for the charge state of the particle filter. With increasing soot charge of the particle filter the exhaust gas back pressure increases. However, the back pressure developing in this part of the exhaust gas duct is not only dependent on the charge state of the particle filter, but also on other engine operating values, for example, the engine load at the point in time when the exhaust gas back pressure is measured. In motor vehicles in which this method is used, therefore for determining the charge state of the particle filter, not only the exhaust gas back pressure is measured, but also the operating state of the engine and particularly engine load values such as the combustion air flow supplied to the engine and engine speed are taken into consideration. With these and additional values the exhaust gas pressure is evaluated for the determination of the charge state of particle filter while eliminating the fault values which are included in the exhaust gas back pressure signal but which are not usable for the determination of the charge state of the particle filter. In this regard, such a method, if used for example in connection with a motor vehicle or in connection with construction machinery powered by a Diesel engine, must include several data intersections for determining the required values and evaluating them. Even if the establishment of the intersections should not be particularly problematic in connection with a new vehicle design it is in general an exclusion criterion to install in an existing motor vehicle. A Diesel particle filter must be regenerated after certain periods of operation if this is to be done at reasonable expense. The same applies to construction machinery.

Based on the state of the art as discussed above it is the object of the present invention to provide a method of installing a heating device of a particle filter wherein the soot charge state of the filter can be sufficiently accurately determined without the need for several intersections for supplying certain engine operating condition values.

SUMMARY OF THE INVENTION

In a method of controlling the energization of a heating device for the regeneration of a particle filter disposed in the exhaust duct of an internal combustion engine, particularly a Diesel engine, wherein a measure for the soot charge state of the particle filter the exhaust gas back pressure is determined while the engine is preferably idling, the exhaust gas recirculation is switched off, and predetermined conditions are present in the exhaust gas duct upstream of the particle filter, and then an exhaust gas back pressure signal is compared with a threshold value indicating a soot charge sufficient for the initiation of a regeneration of the particle filter and the heating device is enabled for the initiation of the regeneration procedure if the exhaust gas back pressure signal is greater than the threshold value.

This solution preferably is used for internal combustion engines which are not always under high load, but which run now and then in idle as it is normally the case with motor vehicle engines.

In a second method, the above object is solved in that within an operating period the temperature of the exhaust gas reaching the particle filter is determined, is evaluated depending on the actual rotational speed of the internal combustion engine with regard to a particle filter charge value assigned to this operating state, the evaluation results are added up, the sum is compared with a certain limit value indicating that the particle filter can be regenerated and, if this threshold value is exceeded the heating device is switched on for initiating the regeneration procedure and, after the regeneration procedure a new operating cycle is started. This solution is to be used in connection with internal combustion engines which only rarely reach an operating state in which the soot is automatically burnt off or engines for which no idling phases are provided or occur.

This applies for example to construction machinery driven by Diesel engines such as hydraulic systems.

In both methods additional operating values are basically not needed. The operating values needed can easily be obtained by sensors which can easily be installed. As a result, the methods proposed herein are particularly suitable for installation into existing internal combustion engines.

In the first method, it basically is not necessary to determine additional operating values to permit a compensation for the exhaust gas measured back pressure signal. This method utilizes the fact that the exhaust gas back pressure signal as obtained during engine idling without load is to a large extent determined by the particle filter, that is, by the charge state thereof. For increasing the measuring contrast between the exhaust gas back pressure generated with an uncharged particle filter and that generated with a soot-laden particle filter, before the determination of the exhaust gas back pressure signal, the exhaust gas recirculation generally present in modern Diesel engines is switched off which results in a larger gas value flow in the exhaust duct. Upon determining or respectively measuring the exhaust gas back pressure signal in this operating state described, the signal is compared with a threshold value which serves as measure for the pressure of a sufficient soot charge of the particle filter that is, that sufficient soot has been deposited on the filter to permit a measurable regeneration. If this threshold value is exceeded, the soot can be burnt off by activating the heating device for example by energizing a thermoelectric heater. However, in order to avoid that the filter regeneration is initiated too early, for example, as a result of a faulty exhaust gas back pressure signal, it is an advantageous embodiment of the invention that the heating device is only activated when also the exhaust gas back pressure signal of the proceeding idling phase or of two or more proceeding idling phases has exceeded the threshold value.

When the method is used in a motor vehicle the particle filter is regenerated either by an active regeneration in the way described or, during an extended high load engine operation, in that, the exhaust gas temperature in the particle filter is sufficiently high to cause an automatic regeneration of the particle filter. If, however, neither the one nor the other state is established, that is, the particle filter regeneration is not initiated, it is expedient if an active regeneration is initiated in any case after a certain engine operating period. Such an operating period determination may be, for example, a time interval of engine operation and/or in a motor vehicle, a travel distance. At the end of such a period, an active regeneration of the particle filter is then initiated.

For the second method basically only a temperature sensor for determining the temperature of the exhaust gas reaching the particle filter is needed. The engine speed can easily be determined or is available also without the need for a connection to the engine management system. This method is based on the realization that under an increased load at constant engine speed the exhaust gas temperature rises. Because of the larger amount of fuel required for the combustion under a higher load engine operation the soot particle generation of the engine is also increased. Therefore, this value can be used as a measure for the respective actual charge increase of the particle filter. By repeated temperature-engine speed measurements within an operating phase the actual soot charge state of the particle filter can be estimated. The charge values determined from the measured temperature and engine speed data are added up for an estimation of the increasing soot charge of the particle filter during this engine operating phase. When the soot charge of the particle filter determined in this way has reached a certain predetermined limit value which is so selected that the charge state of the particle filter is suitable for initiating soot burn off. The limit value may also be so selected that the charge state has not yet reached a critical value, which could detrimentally affect the operation of the internal combustion engine or with which, during soot burn-off, the particle filter could be damaged. Therefore, upon reaching or exceeding this limit value the heating device is activated so that the soot burn-off is initiated. Depending on the operation of the method, as the heating device is made available it may, at the same time, also be energized so that the soot burn up is initiated or the heating device is only then switched on when another condition is fulfilled, for example, that the engine is operating at a certain operating state. If the energization of the heating device is made dependent on the presence of a certain engine operating state, the soot burn off can be initiated when the engine is in an operating state which is optimal for soot burn off. Depending on the momentary operating state of the engine, the initiated soot burn off may have different regeneration results for the regenerated filter surface areas. It is therefore expedient to wait, after the heating device has become available, for a certain time to see if the engine reaches such an operating state. This should occur within a certain period. If within this period, burn off is not initiated, the heating device is energized in order to initiate the soot burn off. Within this period, the requirements with respect to the quality of the regeneration at a certain engine operating state may be reduced.

It is noted that there is a difference between "making the heating device available" and "switching the heating device on". A heating device is made available when a first condition is fulfilled. Therefore, generally the time of making the heating device available and the switching on of the heating device are spaced apart.

BRIEF DESCRIPTION OF THE DRAWINGS

For a better understanding of the invention reference may be had to the accompanying drawings exemplary of the invention, in which.

DESCRIPTION OF THE PREFERRED EMBODIMENTS

Figure 1:
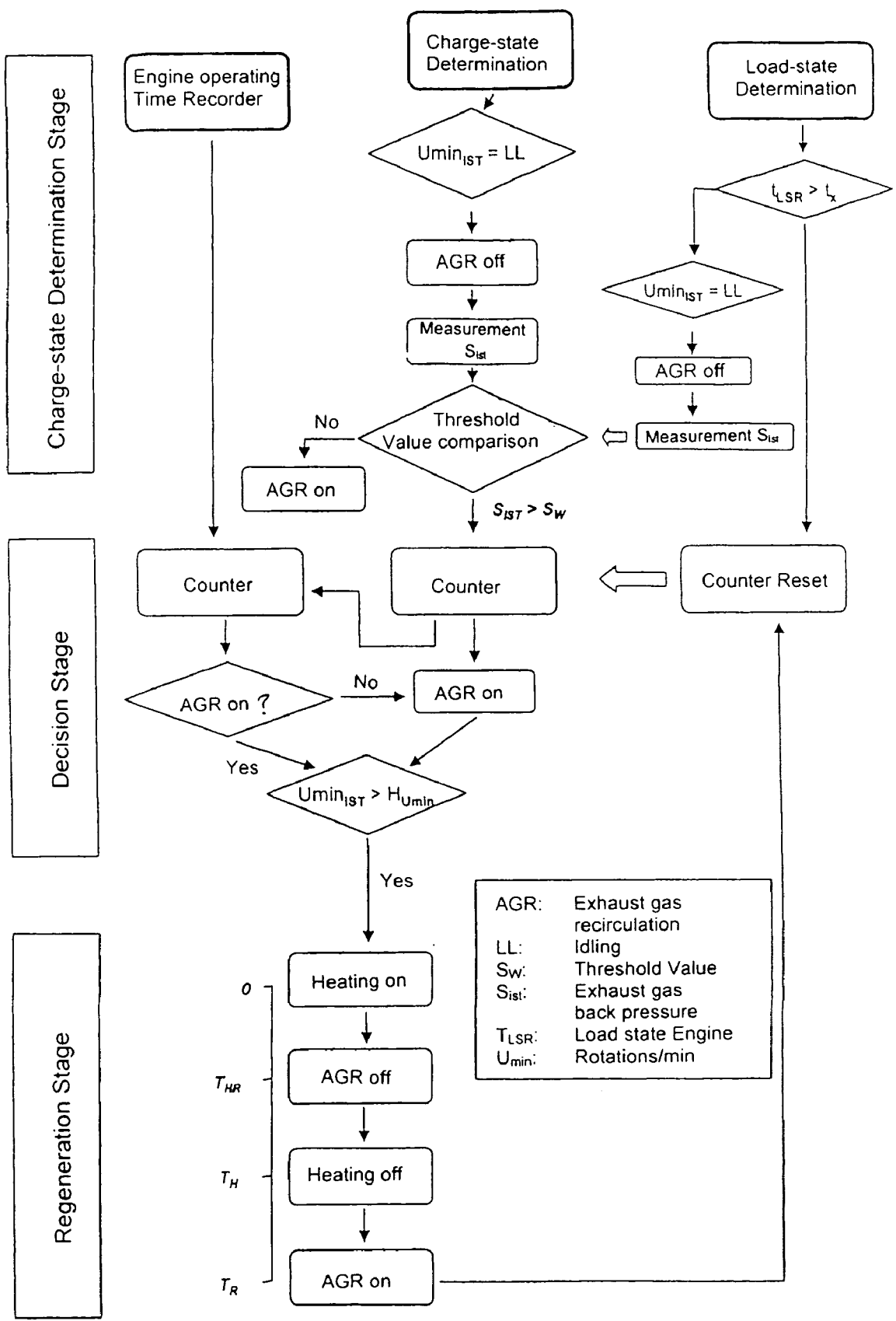
FIG. 1 is a block diagram representing the method of controlling a thermoelectric heating device for regenerating a particle filter arranged in the exhaust duct of a motor vehicle Diesel engine; and, FIG. 2 shows a diagram representing an operating field of another method of controlling a thermoelectric heating device for generating a particle filter arranged in the exhaust duct of a motor vehicle Diesel engine.

With the method as shown in FIG. 1, in each idle operating phase of the engine, the soot charge state of the particle filter is determined by measuring the exhaust gas back pressure $S_{IST}$. In order to ensure that essentially constant exhaust gas back pressure conditions are present in the exhaust duct leading to the particle filter, the exhaust gas back pressure $S_{IST}$ is measured in the described arrangement only after the idle operating state has stabilized for five seconds. When the engine idle speed has been reached the exhaust gas recalculation AGR is switched off. Then for measuring the exhaust gas back pressure it waits until sufficient constant conditions have been established. Basically, after a predetermined time interval the exhaust gas back pressure can be measured.

In a particular embodiment the exhaust gas back pressure is continuously measured and, for the subsequent evaluation, a value is selected which is within the tolerance limit of a certain number of preceding measurements. The consistency of the exhaust gas back pressure values determined indicates that constant operating conditions have been established in the exhaust duct section upstream of the particle filter. The engine speed determination which may be needed therefore can be obtained easily by way of the electric power generator of the Diesel engine.

The exhaust gas back pressure signal $S_{IST}$ is subsequently compared with a threshold value $S_w$. The size of the threshold value $S_w$ represents an exhaust gas back pressure, of which it can be assumed indicates a soot charge of the particle filter which is sufficiently high for an initiation of the soot burn up. If the exhaust gas back pressure $S_{IST}$ is higher than the threshold value $S_w$, that is applied to a counter "charge state determination". However, the regeneration procedure in this embodiment for measurement redundancy reasons is initiated only when the exhaust gas back pressure signal $S_{IST}$ and several, for example two, of the previously obtained exhaust gas back pressure signals are higher then the threshold value $S_w$.

If over a certain engine operating period, no idle conditions occur in the embodiment described also the engine operating period is recorded. The engine operating time period is monitored in an additional counter "engine operating time recorder." If within a predetermined period of operation of the Diesel engine the regeneration of the particle filter has not been initiated for other reasons then the regeneration of the particle filter is initiated when the predetermined engine operating period is exceeded. The predetermined time period, after which a filter regeneration is initiated is so chosen that, with an average Diesel engine load over such a time period the particle filter is charged with sufficient soot for a regular regeneration.

The charge state determination described and the engine operating time determination therefore are therefore used for determining the charge state of the particle filter.

Along with the two described determinations also the load state of the Diesel engine is recorded. This load state determination may be limited to determining only those states wherein a soot burn off occurs automatically, that is, when the Diesel engine operates over a certain time under a predetermined load state wherein the exhaust gas temperature is sufficiently high to cause auto-ignition of the soot. This load state can be determined for example by way of the engine speed and an observation of the duration in which the Diesel engine operates in that load state. Also, the exhaust gas temperature upstream of the particle filter can be determined. If the Diesel engine is operated under the load as required for self generation over a certain period $t_x$ it can be assumed that the particle filter has been regenerated automatically. When this has been determined, the counter for determining the engine operating time and the load state determination via the determination of the exhaust gas back pressure are reset.

When the earlier described load state for the auto regeneration of the particle filter has been reached, the subsequent idling phase can be utilized to adapt the threshold value $S_w$ to the exhaust gas back pressure of the particle filter which continuously increases over time. If the particle filter is not regenerated, the exhaust gas back pressure caused by the particle filter increases during operation by a slow accumulation of ash particles which are the unavoidable residues of the regeneration procedure. The exhaust gas back pressure signal generated in this idling phase then represents a new base value for the exhaust gas back pressure of the "clean" particle filter. Depending on charges between the momentary value of the uncharged particle filter and the value previously used as the threshold value, the threshold value $S_w$ required for the threshold value comparison is adapted. The threshold value $S_w$ can also be adapted with regard to other failures if this should be desirable or necessary.

In the stage of the method designated in FIG. 1 as the decision stage, the point in time is determined when a regeneration of the particle filter is actively initiated. This may occur on one hand when the counter for the charge state determination via the determination of the prevailing exhaust gas back pressure has reached the predetermined value, and for the case that the exhaust gas recirculation is shut down the exhaust gas recirculation is switched on. The thermoelectric heating device is energized in the given example only when the engine has also reached a predetermined minimum speed $H_{UMIN}$. At an engine speed higher than idling a higher electric current can be derived from the system of the motor vehicle for the energization of the heating device. If this speed $H_{UMIN}$ is exceeded, the heating device is energized to a gradually increasing degree so that the energization of the heating device is not noticed by a user and the electric power generator is not suddenly subjected to the high power requirements. The gradual energization of the heating device to the maximum degree may take for example two seconds.

In the embodiment shown for the energization of the thermoelectric heating device, preferably a radiation heating device, the exhaust gas recirculation is switched on or it remains switched on if it was already switched on at the time the regeneration signal was generated so that, because of the smaller exhaust gas volume flow in comparison with a state in which the exhaust gas recirculation is switched off, the exhaust gas in the exhaust duct is more rapidly heated. To ensure a good soot burn off, after the heating device has been energized at maximum power input for a certain time $T_{HR}$ the exhaust gas recirculation is shut off so that upstream of the particle filter flow is a higher oxygen content in the exhaust gas duct in order to support the soot burn off. The thermoelectric heating device remains energized for a time $T_H$ and is then slowly de-energized. The energization is maintained for a period sufficient to initiate a safe soot burn off by the heating device used. After a predetermined time interval $T_R$ the exhaust gas recirculation is again switched on since generally at this point a complete soot burn off has taken place.

After successful regeneration, with the reestablishment of the exhaust gas recirculation the two counters "engine operating time recorder" and "charge-state determination" are reset. If the regeneration procedure is initated by the counter "charge-state determination" the counter "engine operating time recorder" is reset at the same time.

If the engine is shut down during the regeneration procedure or another error is determined before the point in time $T_R$ has been reached in the regeneration stage the counters "charge-state determination" and "engine operating time recorder" are not reset and, at the next occasion the regeneration is restarted.

If within a predetermined time period of engine operation, no regeneration has occurred, an initiation signal is provided by the counter "engine operating time recorder."

Figure 2:
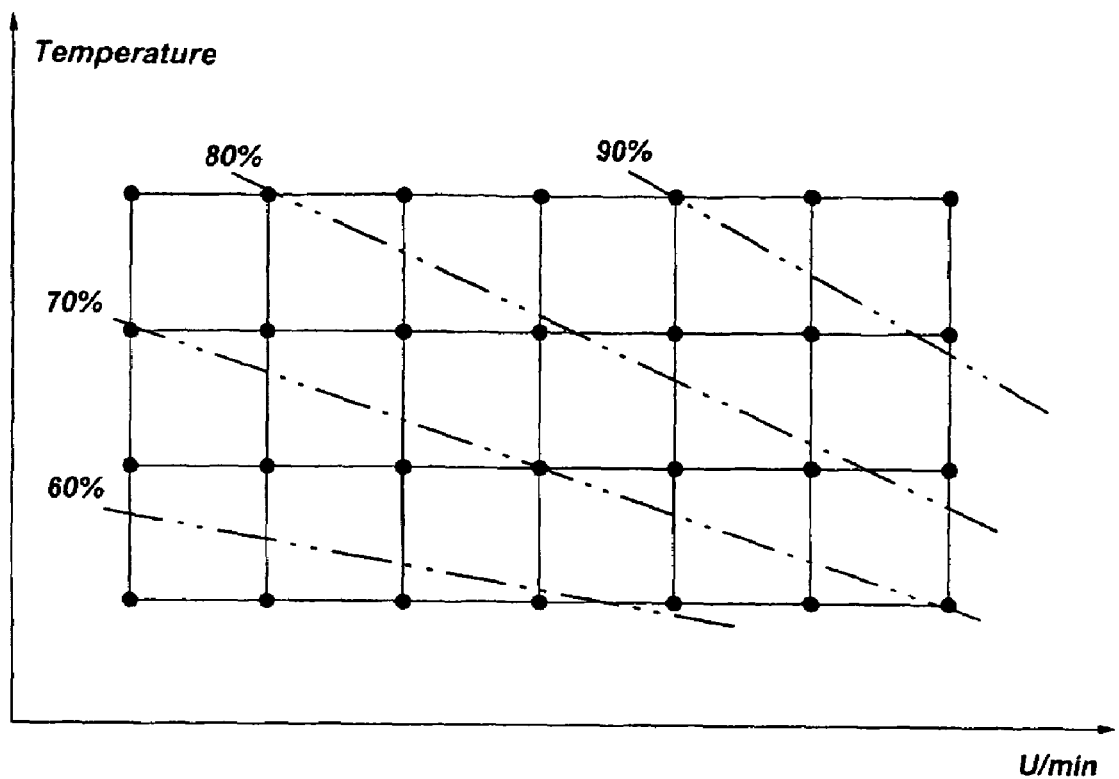

FIG. 2 shows a temperature-speed diagram for determining an operating range for another method of controlling a heating device for a particle filter disposed in the exhaust gas duct of a Diesel engine. On the Y axis the temperature of the exhaust gas upstream of the particle filter is plotted. On the X axis the speed of the engine is given in rpm. The intersecting points of the operating range shown in this diagram represent soot charge amounts depending on the engine speed and the load state of the engine with a certain exhaust gas temperature, measured in the exhaust duct of the internal combustion engine just upstream of the Diesel particle filter, which is deposited on the particle filter at this operating state of the engine. With this method the soot charge of the particle filter is determined by averaging the evaluation results obtained in a certain time interval from the momentary temperature-speed measurements in accordance with the operating range shown in FIG. 2. Several temperature-speed measurements performed in a time interval are averaged in order to reduce the calculation expenses and to compensate for operating variations. The values are added up by way of the evaluation results represented in FIG. 2 until a predetermined limit value has been reached. This limit value is predetermined. The determination of the limit value is so conceived, that when reaching the limit value the soot charge of the particle filter is sufficient and suitable to ensure a fast soot burn off. However, this limit value is also so selected that soot burn off is not necessary immediately when the limit value is reached but that the soot charge of the particle filter can still increase without negatively affecting the operation of the internal combustion engine and without encountering the risks of an excessive soot charge during a soot burn off. When the limit value has been reached or exceeded the first condition of this method is fulfilled for energizing the heating device.

When the limit value has been reached the heating device is enabled with the method according to the invention so that the switching on of the heating device depends on the fulfillment of another condition. This second condition is, in the method as described herein, the operating state of the internal combustion engine. With this method the soot burn-off should be initiated when not only the soot charge of the particle filter is appropriate but when also the operating conditions of the internal combustion engine are favorable for a soot burn off so as to hasten the soot burn off. The soot burn off is supported by a relatively high exhaust gas temperature. In FIG. 2 for this purpose regeneration success-iso lines are indicated, that is, dashed lines indicating the likelihood of success of the regeneration depending on the engine operating state, that is depending on the exhaust gas temperature upstream of the particle filter and the momentary engine speed in rpm. The depicted percentage values in this figure indicate the likely regenerated areas of the particle filter surface area available if the soot burn off is initiated at an operating state corresponding to the associated dashed lines indicated in FIG. 2. When the charge limit is exceeded and consequently the heating device is enabled, the soot burn off is not initiated until the internal combustion engine reaches an operating state in which a full regeneration of the particle filter can be expected. In order to prevent an excessive charging of the particle filter however a time limit is provided however within which the operating state of the engine must be reached which is optimal for the energization of the heating device. This time period is divided into individual time internals, each with a different requirement criterion with respect to the state of the interval combustion engine for energizing the heating device. In a first time interval, the optimum operating condition of the engine for the initiation of the soot burn off wherein an at least 90% filter regeneration can be obtained, see FIG. 2. If during the first interval no such optimum conditions occur and therefore the particle filter is not regenerated, in the second time interval the requirement is reduced for example to 80%. The staging of the time intervals and the degree of reduction can be adapted to the respective operating conditions of the engine. If at the end of two intervals, the second condition is not achieved, that is a certain engine operating state did not occur, the heating device is energized independent of the engine operating state in order to initiate the regeneration of the particle filter. After the regeneration, the next operating cycle for the filter regeneration is started.

Instead of measuring the temperature directly upstream of the particle filter, the exhaust gas temperature may be measured also at other locations in the exhaust duct ahead of the particle filter.

The method described in connection with FIG. 2 may also be combined with the method as described in connection with FIG. 1. Generally, the method described in connection with FIG. 2 is used if an idling phase does not occur within a particular operating phase.

What is claimed is:

1. A method of controlling the energization of a heating device for the regeneration of a particle filter disposed in an exhaust duct of an internal combustion engine such as a Diesel engine, wherein as a measure for the soot charge state of the particle filter the exhaust gas back pressure is determined, and the exhaust gas back pressure ($S_{IST}$) is measured when the following conditions are fulfilled:

the engine is idling;

the exhaust gas recirculation is switched off; and, certain conditions are present in the exhaust duct upstream of the particle filter and, subsequently, the exhaust gas back pressure signal ($S_{IST}$) is compared with a threshold value ($S_w$) indicating a soot charge sufficient for the initation of a regeneration of the particle filter and the heating device is enabled for the initiation of a regeneration procedure, if the exhaust gas back pressure signal ($S_{ist}$) is greater than the threshold value ($S_w$).

2. The method according to claim 1, wherein after the enabling of the heating device for the initiation of the regeneration procedure the heating device is energized only when the momentary exhaust gas back pressure signal ($S_{IST}$) and at least one immediately preceding exhaust gas back pressure signal are greater than the threshold value ($S_w$).

3. The method according to claim 1, wherein the load state of the engine is determined and, with the determination of a load state ($T_{LSR}$) over a predetermined period ($t_x$) wherein the soot is automatically burned off and the particle filter is consequently automatically regenerated, a counter for generating an initiation signal is reset.

4. The method according to claim 3, wherein the threshold value ($S_w$), with which the determined exhaust back pressure signal ($S_{IST}$) is compared is adapted to the exhaust gas back pressure signal measured in the idling phase following a counter reset.

5. The method according to claim 4, wherein independent of an earlier enabling the heating device is energized for the initiation of a regeneration procedure if no idling phase has occurred within a predetermined operating period.

6. The method according to claim 5, wherein within an operating phase at least one of the engine operating time and the travel distance are evaluated.

7. The method according to claim 5, wherein within an operating phase repeatedly the temperature of the exhaust gas supplied to the particle filter is determined and is evaluated depending on the momentary engine speed with regard to a particle filter charge at the respective operating state, the evaluation results are added up, the sum is compared with a predetermined limit value which indicates that the charge state of the particle filter is suitable for a regeneration of the filter, and when the limit value is exceeded, the heating device is enabled to initiate regeneration and, after a following regeneration procedure a new operating phase is started.

8. The method according to claim 1, wherein the heating device is a thermoelectric heating device, particularly a radiation heating device.

9. A method for controlling a heating device for the regeneration of a particle filter disposed in the exhaust duct of an internal combustion engine, with at least two operating phases, and within one operating phase the temperature of the exhaust gas upstream of the particle filter is repeatedly determined, depending on the momentary engine speed, this temperature of the exhaust gas is evaluated depending on the momentary engine speed with regard to a particle filter charge value occurring in this operating state, the evaluation results are added up, the sum is compared with a predetermined limit value representing the charge state of the particle filter and indicating that the particle filter is ready for regeneration and when exceeding the limit value the heating device is enabled for an initiation of the regeneration procedure and, after the regeneration procedure a new operating phase is started.

10. The method according to claim 9, wherein the exhaust gas temperature and the engine speed are determined over a predetermined period, the temperature and engine speed values determined over this period are averaged to provide average values and the average values are used for further evaluation.

11. The method according to claim 9, wherein after enabling of the heating device, for the initiation of the regeneration procedure, the heating device is energized when the engine is in an operating state providing for a regeneration of a largest possible surface area of the particle filter.

12. The method according to claim 11, wherein for determining an engine operating state, which is advantageous for the regeneration of the particle filter, the temperature of the exhaust gas supplied to the particle filter is determined and is evaluated with regard to the probability of the regeneration success in the given engine operating state.

13. The method according to claim 12, wherein the time period between the enabling and the switching on of the heating device is limited and after the limited period has expired the heating device is switched on independent of the operating state of the engine.

14. The method according to claim 13, wherein the requirements on the expected quality of a soot burn off are reduced toward the end of the limited time period.

15. The method according to claim 9, wherein the heating device is a thermoelectric heating device, particularly a radiation heating device.

* * * * *